United States Patent Office 3,489,744
Patented Jan. 13, 1970

3,489,744
PREPARATION OF DIISOCYANATE DIMERS IN AQUEOUS MEDIUM
Andor Schwarcz, Weehawken, N.J., and Gordon D. Brindell, New Haven, Conn., assignors to Uniroyal, Inc., New York, N.Y., a corporation of New Jersey
No Drawing. Filed July 18, 1966, Ser. No. 565,691
Int. Cl. C07d 47/00; C07c 119/04; C08g 22/32
U.S. Cl. 260—239                    5 Claims

ABSTRACT OF THE DISCLOSURE

Aromatic diisocyanate dimers, also called uretidinediones, are prepared from such aromatic diisocyanates as MDI or TDI by agitating the diisocyanate in water in the presence of a surface active agent and a catalyst of the tertiary amine-type (e.g., triethylamine) or phosphine-type (e.g., tributyl phosphine). The resulting aqueous dispersion of the diisocyanate dimer provides a storage-stable composition when mixed with polyols or polyamines normally reactive with isocyanate to form polymers. Heating the composition regenerates the diisocyanate monomer and reaction takes place to form a useful high polymer (polyurethane or polyurea). Polymeric surface coatings may be formed in this manner.

---

This invention relates to the preparation of dimers of diisocyanates in an aqueous medium, and more particularly it relates to the dimerization of aromatic diisocyanates in aqueous dispersion, to produce an aqueous suspension or latex of an aromatic diisocyanate dimer.

In one aspect, the invention is based upon the discovery that dimers of aromatic diisocyanates can be prepared by the action of a catalyst on an aromatic diisocyanate in an aqueous medium.

In another aspect, the invention is concerned with storage-stable aqueous compositions of aromatic diisocyanate dimers and polyfunctional substances normally reactive with monomeric diisocyanates to form useful high polymers, notably polyols, polyamines, and mixtures thereof. This aspect of the invention is based upon the unexpected discovery that the dimers, themselves containing two —NCO groups, are of such reduced reactivity that they will not react with such polyols or polyamines under ordinary conditions, but at temperatures sufficiently elevated to regenerate the original diisocyanate monomer, reaction takes place to form a useful high polymer (polyurethane and/or polyurea). This form of the invention is particularly useful for coating or impregnating with polyurethanes, or for making dipped or cast polyurethane shaped articles, from compositions which have indefinitely long shelf life.

The aromatic diisocyanate dimers with which the invention is concerned are aromatic uretidinedione diisocyanates having the formula

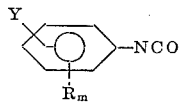

wherein

R is alkyl, alkoxy, phenoxy, halogen or hydrogen;
$m$ is 1 or 2;
Y is

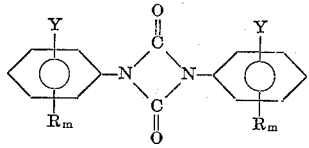

—NCO,

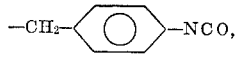

or >(C$_4$H$_3$NCO) (fused to the benzene nucleus to form a naphthalene structure).

Such aromatic uretidinedione diisocyanates have previously been prepared in non-aqueous systems by the action of catalysts, such as tertiary amines or phosphines, on aromatic diisocyanates. Such dimers are known to be vulcanizing agents for urethane rubbers in non-aqueous systems (British Patent 783,564; L. Ya Rappaport et al., Sov. Rub. T. 23, 19 [1964]).

We have now surprisingly discovered that aromatic diisocyanate dimers of the formula stated above can be made in an aqueous medium. Thus, when an aromatic diisocyanate such as methylene-bis(4-phenylisocyanate) or 2,4-tolylene diisocyanate or the like, is subjected to the action of a catalyst such as a tertiary amine or a phosphine, in the presence of water, it is unexpectedly found that the dimer of such diisocyanate is readily formed in good yield. It could not have been predicted that the diisocyanate dimer would be produced in an aqueous medium, because of the known tendency of the starting diisocyanate to react rapidly with water. The dimerization of aromatic diisocyanates in the presence of water in accordance with the invention has multiple important advantages, among which may be mentioned the ability to make a dispersion of diisocyanate dimer in a single step. Such dispersions can be used directly in the preparation of coating, adhesive, impregnating, dipping, or casting compositions without recourse to a separate ball-milling step to subdivide the dimer particles.

The aromatic diisocyanates which may be dimerized in the presence of water in accordance with the invention to produce the described uretidinedione diisocyanates may be represented by the formula

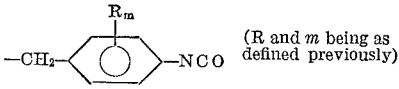

wherein R, $m$, and Y have the values previously indicated. Examples of such diisocyanates are methylene-bis(4-phenylisocyanate), 2,4-tolylene diisocyanate (in pure form, or in admixture with other isomers), methylene-bis(2,4-tolylene isocyanate), 4,4'-bianisyl diisocyanate chlorophenylene diisocyanate, methylene - bis(chlorophenylisocyanate), 1,3-phenylene diisocyanate and 1,4-phenylene diisocyanate.

To prepare the diisocyanate dimer in an aqueous medium in accordance with the invention the starting diisocyanate monomer is mixed with water in the presence of a catalytic amount of a conventional dimerization catalyst such as a tertiary amine or a phosphine. The amount of water present is in no way critical, but it may be mentioned by way of non-limiting illustration that the water may for convenience constitute from 25% to 98% by weight of the reaction mixture. The catalyst is of course used in conventional small amount, say, for example, 0.01% or less to 2% or more by weight of the mixture. The catalyst may be added to the water, or to the diisocyanate. Such conventional catalysts as aliphatic tertiary amines, especially tri(lower alkyl) amines, e.g., triethylamine, tri-n-propylamine, etc., may be used. N-methyl- and N-ethyl-morpholine also are suitable. Phosphines such as Bu$_3$P, Et$_3$P, tri-n-octyl phosphine, and Me₂φP, may be mentioned as suitable, by way of non-limiting example. In general, any such catalyst of the formula $R_3P$, $R_2\phi P$, or $R\phi_2P$ may be used where R is methyl to octyl, and φ is phenyl.

The mixture containing the starting diisocyanate, water and catalyst is agitated vigorously, in the presence of a surface-active agent capable of forming an oil-in-water emulsion. The dimerization reaction proceeds at room temperature or lower (e.g., about 0° C.), but if desired the mixture may be heated, for example to a temperature of up to about 80° C. The diisocyanate dimer begins to form within a short time, and dimerization is completed rapidly, thus producing an aqueous dispersion of finely divided particles of dimer.

If the starting diisocyanate is a solid at room temperature it may be melted to facilitate preparation of the aqueous dimer dispersion. Otherwise, a solid starting diisocyanate may be converted to fluid form by dissolving it in any suitable inert organic solvent (e.g., benzene, toluene, n-hexane, n-pentane, xylenes, chloroform, carbon tetrachloride, methylene chloride, acetone, etc.). After completion of the dimerization in water the solvent is usually decanted off, or it may be removed by ordinary distillation or steam distillation.

Any emulsifying agent which will give oil-in-water emulsions is satisfactory for use in the present invention. Satisfactory types of emulsifying agents are the polyethylene glycol ethers of long chain alcohols; quaternary ammonium salts; the tertiary amine or alkylol amine salts of long-chain alkyl acid sulfate esters, alkyl sulfonic acids or alkyl aryl sulfonic acids; and alkali metal salts of high molecular weight organic acids. Nonionic agents may be used, as well as alkali metal salts of such acids as tall oil or rosin.

If desired, the thus-formed aqueous dispersion of diisocyanate dimer may be made more stable by the addition of a protective colloid or thickener, such as gum tragacanth or ammonium alginate.

The aqueous dispersion of diisocyanate dimer may be shipped or stored as such, and there is no tendency, at ordinary ambient temperatures, for the dimer to react with water or other reagents containing active hydrogen which are ordinarily reactive with diisocyanates, such as amines, alcohols or acids. Only when the dimer is subjected to temperatures sufficiently elevated to cause dissociation to the original diisocyanate monomer will reaction with active-hydrogen-containing materials take place. Usually temperatures in excess of 100° C., preferably at least about 150° C., are used to bring about dissociation of the dimer at an appreciable rate so that the desired polyurethane (and/or polyurea) forming reaction can take place. Higher temperatures, e.g., 250°–300° C., may also be employed if desired to bring about faster reaction. It will be understood that the dissociation temperature of the dimer is not a fixed, definite temperature like a sharp melting point, but rather the dissociation proceeds at a certain rate which depends upon the temperature. The above-mentioned dimerization catalysts can be used to speed up the rate of dissociation of the dimer and/or to lower the temperature of dissociation.

In accordance with an important form of the invention, the aqueous dispersion of diisocyanate dimer is employed in compositions which further include polyfunctional material normally reactive with free diisocyanate monomer to produce high polymers. Such materials are sometimes described as organic compounds containing at least two active hydrogen atoms which display activity according to the Zerewitinoff test. Particular mention may be made of the polyols of the kind normally used to produce polyurethanes, and/or polyamines of the kind normally used to form polyureas. Such compositions of the invention, comprising aqueous aromatic diisocyanate dimer, along with a polyol and/or a polyamine, are storage-stable (unreactive) at ordinary ambient temperatures and in fact there is no tendency to react at an appreciable rate even when the composition is heated at the boiling point of water. As soon as the temperature is elevated sufficiently to produce dissociation of the dimer (e.g., 150° C. or more), then reaction between the liberated diisocyanate monomer and the polyol and/or polyamine can take place to form a useful high polymer having polyurethane and/or polyurea linkages. This form of the invention is useful for coating, impregnating, dipping or casting, from aqueous compositions which, after application and drying (e.g., at temperatures up to 100° C.), and upon heating to a sufficiently elevated temperature (e.g., 150° C.), form polyurethanes and/or polyureas in situ.

The polyols suitable for use along with diisocyanate dimer aqueous dispersion to form useful coating, impregnating, casting, or like compositions in accordance with the invention are glycols and higher polyols, of the kinds conventionally used for making polyurethanes by reaction with diisocyanates, notably alkylene ether glycols and poly(alkylene ether) glycols, especially those in which the alkylene group is a lower alkylene group. Examples of such polyols are ethylene glycol, polyethylene glycol, propylene glycol, polypropylene glycol, mixtures of polyethylene and polypropylene glycols, trimethylene glycol, butane diol, polybutylene glycol, polytetramethylene glycol, glycol-terminated polyesters such as poly(ethylene adipate), poly(ethylene propylene adipate) and polybutadiene diols. Hydroxy-terminated, linear self-condensation products obtained by esterifying a saturated dicarboxylic acid having 4–20 carbon atoms with an excess of a saturated glycol having 4–20 carbon atoms may be mentioned as particularly suitable, as well as the poly(alkylene oxide) glycols usually used in making polyurethanes. Also, higher polyhydroxy compounds such as triols, e.g., trimethylol propane, trimethylolbutane, hexane triol may be used; also glycerine, castor oil, or the triols of Price 2,866,774. It will be seen that the polyol employed may be a monomeric material of relatively low molecular weight, or it may be a polymer of which the molecular weight will frequently be between 500 and 3000, or higher. The composition will typically contain from about 0.9 to 2.5 equivalents of potentially available NCO per equivalent of OH. If desired, there may further be included in the composition a catalyst of the kind conventionally used for chain-extending a polyurethane, such as stannous octoate or dibutyltin dilaurate, or the like. The amount of water in the composition is a matter of choice and will depend among other things on the manner of application (for example, whether by spraying, brushing, spreading, dipping, or casting), but in general the combined weight of polyurethane-forming ingredients in the composition will range from about 5% to about 50% by weight. The composition may of course further include other conventional ingredients, suitable to the particular application, such as pigments or fillers, plasticizers, thixotropic agents, dispersing agents or stabilizers, blowing agents, etc. Since the composition at ambient temperatures is non-reactive to amines or acids, these may be used, if desired, to adjust the pH of the dispersion. It will be understood that the composition is, as pointed out previously, a stable material, that can be mixed, stored, shipped, processed and applied without any undesirable tendency to premature reaction of the diisocyanate dimer with the polyol. After impregnation or coating of a fabric with the composition, or after application of the composition to some other base that it is desired to coat such as metal, plastic, rubber, or wood, the assembly can be heated (for example at temperatures approaching 100° C.) to drive off the water, after which further heating, (e.g., at 150°–250° C.) causes the dimer to dissociate to form the free diisocyanate, and reaction with the polyol then takes place to form in situ the polyurethane impregnant or coating. Thus, coatings formed in this manner will be found to have excellent adhesion to such bases as metal, as well as hardness and other properties desirable in a surface coating.

One form of the present invention resides in an aqueous composition of diisocyanate dimer and polyurethane-forming polyol, in the form of an oil-in-water emulsion, for application to fabrics. Thus, greatly improved wear and abrasion resistance can be imparted to fabrics, using conventional finishing equipment, by applying an oil-in-water emulsion system containing at least one diisocyanate dimer and at least one polyurethane-forming polyol. Fabric treated with such a composition (e.g., fabrics of cotton, nylon, polyester, polypropylene, acrylic, rayon, etc.) may be subjected to moderate heat to evaporate from the system and "unblock" the diisocyanate by dissociation of the dimer. Catalysts such as lead octoate, lead benzoate, etc., may be used to speed up the cure cycle (i.e., the reaction between the liberated diisocyanate and the polyol to form the polyurethane). This procedure is particularly advantageous, as compared to the procedure described in British Patent 996,208 for example, in that in the present process there is no necessity for employing blocking agents such as ketoximes, imines, alcohols, phenols or secondary amines, and neither is it necessary according to the present procedure to employ unblocking curing agents such as N,N,N'N" - tetrakis(2 - hydroxypropyl)ethylenediamine, triisopropanolamine, or triethanolamine, as employed in the said British patent.

We furthermore desire to point out that the invention provides substantial advantages over the conventional practice of using a phenol or similar blocking agent for the diisocyanate. In such conventional practice the phenol or other blocking agent is disposed of in ovens during unblocking, and this represents an economic waste. Toxic and irritating vapors of the blocking agent are difficult to deal with.

In place of, or in addition to, polyurethane-forming polyols, we may as indicated previously employ polyamines in the aqueous diisocyanate dimer dispersion. Thus, such aliphatic or aromatic primary or secondary diamines as ethylene diamine, the phenylene diamines, 4,4'-diaminodiphenylmethane, or 3,3'-dichloro-4,4'-diamino diphenylmethane may be used, as well as hydrazine. Also, such polyamines as $H_2NCH_2CH_2NHCH_2CH_2NH_2$, triethylene tetramine, or tetraethylenepentamine may be used. Particularly useful are amine-terminated polymers, such as amine-terminated polyamides (e.g., molecular weight 500–3000). These form a final high polymer which is a polyurea, when substituted for the polyol in the composition previously described. If the polyamine is substituted for all the polyol, then the polyamine used is preferably an amine-terminated polyamide, having a relatively low molecular weight of about 500, for example. Such materials are exemplified by amine-containing polyamides which are reaction products of dimerized fatty acids with either ethylene diamine or diethylene triamine; a typical commercial product of this kind has an amine number of 210–220 and an equivalent weight of 525 (e.g., "Versamid 115"). When the polyamine is used along with a polyol, the final polymer contains both polyurethane and polyurea linkages. The polyamine, if used in place of the polyol, may be used in such amount as to provide from 0.9 to 2.5 equivalents of NCO per equivalent of active hydrogen in the amine. If a polyamine is used along with a polyol, the two may be used in any desired proportions with respect to each other.

If desired, more than one dimer may be employed in the aqueous dispersion of the invention, as well as more than one polyol and/or polyamine.

Perhaps the most outstanding advantage of the invention resides in the fact that it provides a composition which contains in itself all the ingredients essential to make in situ a polyurethane high polymer, and yet the composition can be stored for any desired length of time without undesired premature reaction. Thus, it is not necessary to prepare beforehand a diisocyanate-polyol reaction product, ordinarily called a "prepolymer" which in many cases would not be stable to atmospheric moisture, and which in any case could ordinarily not be curable without addition of further bifunctional curing agent. Once such curing agents are added to the prepolymer it ordinarily has only a very limited pot life and must be processed or shaped without delay. The marketing of a composition which is stable but convertible into a polyurethane at will at any time, as in the present case, has not heretofore been possible, as far as the present inventors are aware, without recourse to blocking agents, which are open to serious objections as noted previously.

The surprising fact that diisocyanate dimers are unreactive and storage-stable in highly active media such as alcohols and amines may be demonstrated by preparing the following mixtures:

(A) TDI (2,4-tolylene diisocyanate)dimer, 1 g.+ethylene glycol, 1 g.

(B) MDI (4,4'-methylenebis[phenylisocyanate]) dimer, 15 g.+ethanol, 25 g.+water, 30 g.+isooctyl phenyl polyethoxy ethanol (sold commercially as Triton X–100), 0.2 g.

(C) TDI dimer, 5 g.+butyl amine, 0.5 g.+water, 20 g., Triton X–100, 0.2 g.

The above dispersions were stored for a week. Infrared spectra of the solid part of the dispersions showed the characteristic bands of the NCO group and the dimer ring at equivalent intensities and no bands due to any urea or urethane linkage.

The following examples will serve to illustrate the practice of the invention in more detail.

EXAMPLE 1

The example illustrates the preparation of the dimer of 4,4'-methylenebis(phenylisocyanate), also called "MDI," in water. 4,4'-methylenebis(phenylisocyanate), 300 g., is dissolved in 50 ml. of hot benzene. The cooled solution (room temperature, e.g., 20° C.) is poured into a blendor containing 3 grams of tributyl phosphine and 15 grams of the sodium salt of polymerized formaldehyde naphthalene-sulfonic acid (sold commercially as "Darvan" No. 1) dissolved in 600 ml. of water. The mixture is stirred for ten minutes. The resulting mixture separates into two layers, a benzene layer and an aqueous layer which is a dispersion of solid particles of dimer in water. The benzene layer is decanted and discarded. To stabilize the remaining aqueous dimer suspension, 2 grams of gum tragacanth is added. Infrared spectra of the solid part of the suspension show the absence of any N–H linkages (3400 cm.$^{-1}$), the presence of NCO groups (2280 cm.$^{-1}$), and dimer rings (1770 cm.$^{-1}$) of equivalent intensities which do not decrease after two months' standing.

EXAMPLE 2

MDI (4,4'-methylenebis[phenylisocyanate]), 100 g., is melted (ca. 50° C.). The molten MDI is poured slowly into a blendor containing 1 g. of tributyl phosphine and 2 g. of the sodium salt of lauryl sulfate (sold commercially as Sipon WD) dissolved in 100 ml. of water previously preheated to 50° C. The solution is stirred while the molten MDI is added and the stirring is continued for a few minutes after addition is completed. An aqueous suspension of solid dimer particles in water results. Infrared spectra of the solid part of the warm suspension obtained show again the absence of any N–H linkages, the presence of NCO groups, and dimer rings of equivalent intensities.

EXAMPLE 3

This example illustrates the direct preparation of the dimer of 2,4-tolylene diisocyanate as an aqueous dispersion.

2,4-tolylene diisocyanate, 50 g., is poured slowly into a blendor containing 1 g. of trioctyl phosphine and 1 g. of the sodium salt of polymerized formaldehyde naphthalene-sulfonic acid dissolved in 250 ml. of water cooled to 0° C. The stirring is continued for 5 minutes. A dispersion of the dimer of 2,4-tolylene diisocyanate is formed whose infrared spectra show the presence of NCO groups (2270 cm.$^{-1}$) and dimer rings (1760 cm.$^{-1}$) of equivalent intensities with only very little formation of urea linkages (3400 and 1640 cm.$^{-1}$).

EXAMPLE 4

This example illustrates an aqueous protective coating composition of the invention, and its use on metal. A suspension of MDI dimer may be prepared in accordance with Example 1, having the following composition: MDI dimer, 100 g.; titanium dioxide, 10 g.; "Darvan" No. 1, 2 g.; water, 148 g.; gum tragacanth, 0.5 g. In 43 g. of this dispersion there may then be dissolved 6.3 g. of trimethylolpropane. Such a mixture may then be applied to a polished iron plate by a flat brush. After drying at room temperature, the coated plate may be placed in an air oven and heated to 230° C. for three minutes, to cure the coating. A white, hard polyurethane film is formed, which adheres to the metal base very strongly.

EXAMPLE 5

An aqueous dispersion of 4,4'-methylenebis(phenylisocyanate) dimer may be prepared in accordance with the procedure of Example 1, having the following composition: MDI dimer, 20 g.; sodium dioctyl sulfosuccinate ("Aerosol OT"), 0.5 g.; water, 100 g. To such a latex may be added polyethylene glycol (molecular weight of 1000), 33.3 g., and trimethylolpropane, 2.98 g. The suspension may be stabilized by ammonium alginate, 0.5 g. Such a coating composition is applied to the surface of three different bases, namely, an aluminum foil, a woven nylon fabric, and an ethylene-propylene-diene terpolymer rubber. The coated materials are dried at 60° C. and then cured at 200° F. for 5 minutes. Smooth, flexible polyurethane films are observed, which adhere to the respective bases strongly.

Having thus described our invention, what we claim and desire to protect by Letters Patent is:

1. A method of making an aromatic diisocyanate dimer having the formula

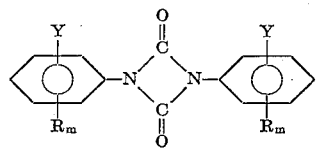

wherein
R is methyl, methoxy, phenoxy, halogen or hydrogen;
m is 1 or 2;
Y is

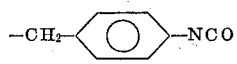

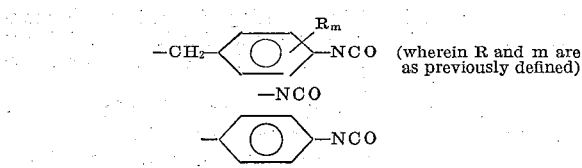

or >(C$_4$H$_3$NCO) (fused to the benzene nucleus to form a naphthalene structure),
comprising mixing water, a surface active agent capable of forming an oil-in water emulsion, an aromatic diisocyanate having the formula

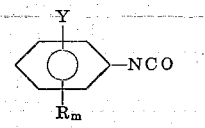

wherein R, m and Y have the values previously stated, and a catalyst selected from tri(lower alkyl)amines, N-methyl morpholine, N-ethyl morpholine, and phosphorus-containing chemicals of the formulas R'$_3$P, R'$_2\phi$P and R'$\phi_2$P where R' is an alkyl group having from 1 to 8 carbon atoms and $\phi$ is phenyl, and vigorously agitating the mixture.

2. A method of making an aqueous dispersion of an aromatic diisocyanate dimer comprising vigorously agitating in fluid form an aromatic diisocyanate selected from the group consisting of 4,4'-methylenebis(phenylisocyanate) and 2,4-tolylene diisocyanate in water in the presence of a surface-active agent capable of forming an oil-in-water emulsion, and a dimerization catalyst selected from tri-(lower alkyl)amines, N-methyl morpholine, N-ethyl morpholine, and phosphorus-containing chemicals of the formulas R'$_3$P, R'$_2\phi$P and R'$\phi_2$P where R' is an alkyl group having from 1 to 8 carbon atoms and $\phi$ is phenyl.

3. A method as in claim 2 in which the said diisocyanate is molten 4,4'-methylenebis(phenylisocyanate).

4. A method as in claim 2 in which the said diisocyanate is 4,4'-methylenebis(phenylisocyanate) dissolved in an organic solvent.

5. A method as in claim 2 in which the said diisocyanate is 2,4-tolylene diisocyanate.

References Cited

UNITED STATES PATENTS 2,683,144   7/1954   Balon et al. _____ 260—239

ALTON D. ROLLINS, Primary Examiner

U.S. Cl. X.R.

8—116.2, 115.5; 117—104, 132, 138.8, 139, 148, 161; 260—29.2, 77.5, 453; 252—188.3